UNITED STATES PATENT OFFICE.

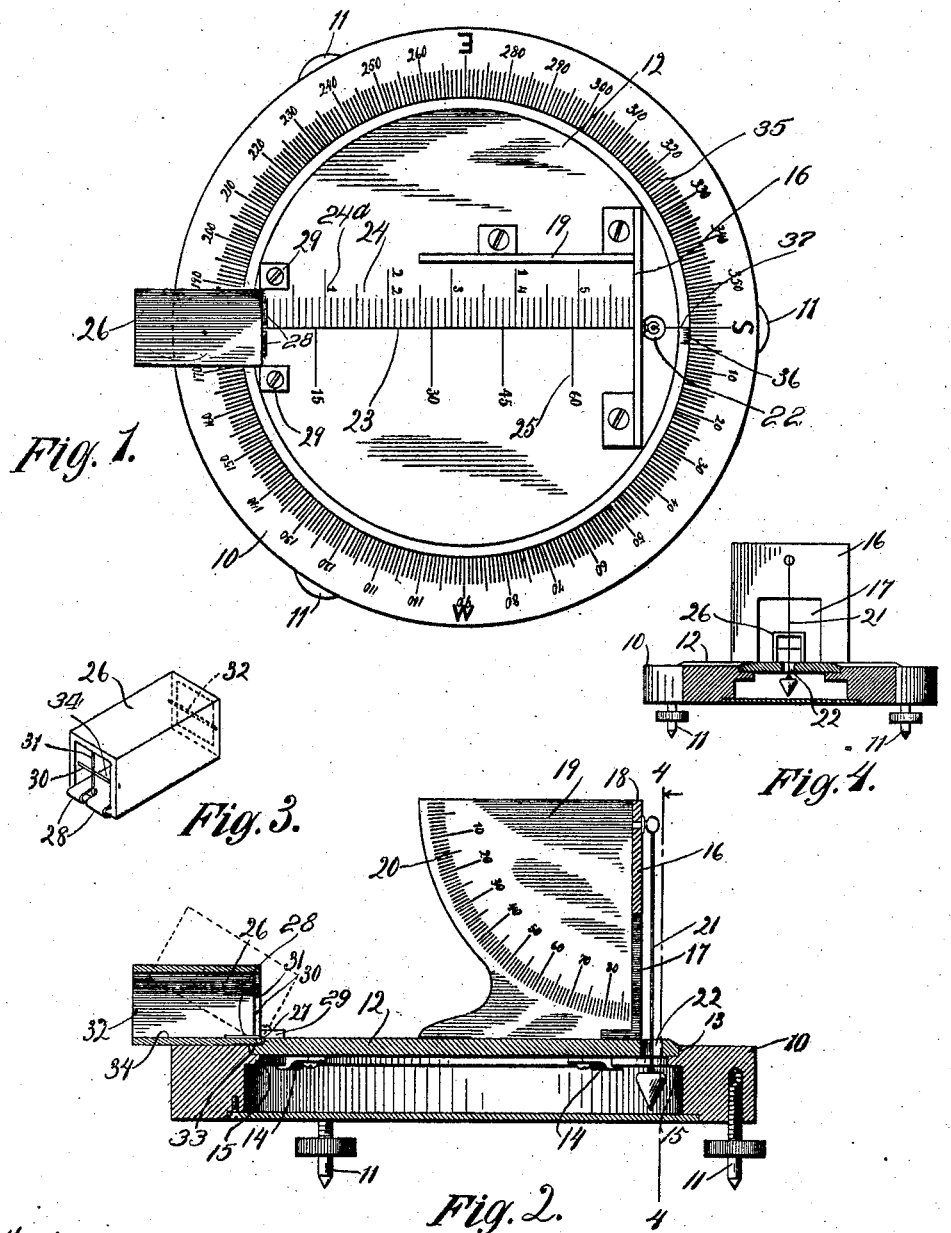

JOHN PAUL GOODE, OF CHICAGO, ILLINOIS.

PHYSIOGRAPHICAL INSTRUMENT.

No. 849,841.　　　　Specification of Letters Patent.　　　　Patented April 9, 1907.

Application filed December 9, 1905. Serial No. 291,046.

*To all whom it may concern:*

Be it known that I, JOHN PAUL GOODE, a citizen of the United States, and a resident of Chicago, county of Cook, and State of Illinois, have invented certain new and useful Improvements in Physiographical Instruments, of which the following is a specification, and which are illustrated in the accompanying drawings, forming a part thereof.

The invention relates to a device adapted for making demonstrations and measurements in connection with the study of physical geography, and has for its object to provide an instrument of simple and inexpensive construction which may be used for determining for a given location, by observations upon the sun, the true north-and-south direction, the plane of the horizon, the longitude and latitude, and the correct sun time, and for quantitatively measuring with reasonable accuracy the altitude and azimuth of the sun and for estimating the intensity of heat and light received from the sun.

The invention is exemplified in the structure to be hereinafter described and claimed, and illustrated in the accompanying drawings, in which—

Figure 1 is a plan view of an instrument constructed according to the invention. Fig. 2 is a central vertical section of the same. Fig. 3 is a detail of the construction drawn in perspective, and Fig. 4 is a sectional detail on the line 4 4 of Fig. 2.

The instrument is provided with a substantial base 10, preferably in the form of a ring, and is supported by leveling-screws 11 11. A circular plate or disk 12 is rotatably mounted on the base, as shown, being seated upon an annular shoulder 13, formed upon the latter, and being held to its seat by means of a plurality of clips 14, engaging an inwardly-directed lip 15 of the base-ring.

An upright frame or arch 16 is mounted upon the disk 12, and an oblong rectangular aperture or door 17 for the passage of light is cut from the lower portion of this frame. Preferably the upper margin of the door 17 and the edge 18 of the frame are exactly parallel to the surface of the disk 12, and a quadrant 19 for receiving the shadow of the frame extends perpendicularly from the rear face of the frame and carries a curved scale 20, ruled in degrees of angle, struck from the intersection of the edge 18 of the frame with the plane of the quadrant.

A plummet is provided for determining when the instrument has been brought to a horizontal position. Preferably this takes the form of the ordinary cord and weight (shown at 21) and is suspended from the face of the frame 16, so that the plummet-cord crosses the aperture 17 and hangs through a small opening 22 in the disk 12.

A line 23, extending perpendicularly from the frame 16 directly behind the cord of the plummet 21, is ruled upon the disk 12, preferably so as to cross its center, and this line is graduated by means of a scale 24 of units of length and a second scale 25 for indicating the inclination from the vertical of the sun when it is caused to cast the shadow of the upper margin of the opening 17 upon this scale in a manner to be hereinafter described. For this purpose the divisions of the scale 25 are equal to the natural cotangents of the angles which they represent.

A tube or open-ended box 26 is hinged to the disk 12 so as to swing in a vertical plane and preferably adjacent the end of the line 23 remote from the frame 16. As shown, this tube is of rectangular cross-section and is joined to the disk by means of a pin 27, firmly secured to the tube by means of straps 28 28 and rotatably seated in a suitable recess formed in the face of the disk by means of the clips 29 29. Cross-hairs 30 and 31 are mounted within the tube adjacent its inner end, and at its farther end a single cross-hair 32 is provided. Preferably the face of the disk 12 is so recessed, as indicated at 33, that the floor 34 of the tube when the latter is turned to a horizontal position, as shown by full lines in Fig. 2, lies in the plane of the surface of the disk.

A scale 35 is ruled upon the face of the base-ring 10 for indicating the angular position of the movable parts of the device, and the line 23 is extended to the edge of the disk 12, as indicated at 37, to provide a suitable reference-mark for reading the scale, and the accuracy of the readings obtained may be increased by means of a vernier 36, ruled on the periphery of the disk adjacent the end of the line.

In using the instrument it will first be accurately leveled by means of the screw-feet 11, the desired position having been reached when the plummet-cord 21 hangs at the center of the opening 22. The true north-and-south direction may then be determined by observations taken at sunrise and sunset of the same day or of days not widely separated, the disk 12 at each of these times being turned so that the shadow of the plummet-cord falls through the opening 17 exactly upon the line 23 and its angular position noted upon the scale 35. The north-and-south direction will then be indicated by a diameter of the disk intersecting the scale 35 at a point designated by the number found by taking half the algebraic sum of the readings just noted.

Preferably the north-and-south direction thus found will be permanently marked upon the table on which the instrument is used for reference in making other observations.

When the north-and-south direction has been once established, the correct sun time may be obtained for any day by noting when the sun crosses the meridian. This is most conveniently done with the instrument described by setting the disk 12 so that the line 23 extends north and south and observing when the shadow of the plummet-cord 21 coincides with the line. The longitude of the place of observation may then be determined by a calculation based upon a comparison of the sun time as thus found with standard time.

The azimuth of the sun may be determined for any hour of the day from sunrise to sunset by noting upon the scale 35 the angular displacement from the north-and-south direction of the line 23 when the disk 12 has been so turned that the shadow of the plummet-cord falls through the opening 17 upon the line.

The altitude of the sun may be observed at any time of day by noting, when the disk 12 has been so turned that the frame 16 faces the sun, as in determining the sun's azimuth, where the shadow of the upper margin of the door 17 falls upon either of the scales 24 or 25. The scale 24 is used for the purpose of making a comparison of readings taken in this way at different hours of the day or at the same hour of successive days, while the scale 25 is so ruled as to indicate the altitude of the sun directly in degrees of angle. The altitude of the sun may also be determined by noting the position of the shadow of the edge 18 of the frame 16 upon the quadrant 19, this method being preferred for the purpose of making demonstrations before students of the less advanced grades, as it will be observed some knowledge of trigonometry is required in order that one may fully comprehend the way in which the scale 25 is graduated.

The latitude of the place of observation may be found by noting in either of the ways just described the altitude of the sun at noon of the equinox, the latitude being then the complement of the angle of elevation of the sun, and by reference to suitable tables of the almanac the latitude may be determined by noting the altitude of the sun at noon of any day of the year.

The tube 26 is preferably of a definite and known cross-sectional area, and if directed toward the sun the relative intensity of radiation from the sun as compared with what the intensity of radiation under similar atmospheric conditions would be if the sun were at the zenith may be estimated by observing the area of the surface of the disk 12, illuminated by a beam of light passing through the tube. The cross-hairs 30, 31, and 32 provide a convenient means of determining when the tube is directed exactly toward the sun. If the cross-section of the tube be regarded as of unit area, the relative intensity of radiation as above defined will be indicated by the expression "one" divided by the illuminated area of the disk 12 when such area is measured in units of the same size as the tube-section. As shown, this area may be read directly upon the scale 24, the smaller units, as 24ª, being equal to the square root of the area of the tube 26.

I claim as my invention—

1. In a device of the kind described, in combination, a base having a protractor-scale ruled on its face, means for leveling the base, a disk rotatably mounted on the base and having a line ruled across its face, the edge of the disk registering with the protractor-scale, a frame mounted on the disk, and a plummet-cord suspended from the frame over the line.

2. In a device of the kind described, in combination, a base, a disk rotatably mounted on the base and having a scale ruled on its face, an apertured frame rising from the disk at the foot of the scale, and a plummet-cord crossing the aperture of the frame and registering with a line of the scale on the disk.

3. In a device of the kind described, in combination, a rotatable disk having a cotangent scale ruled on its face, and an arch-form frame rising from the disk at the foot of the scale.

4. In a device of the kind described, in combination, a rotatable disk having a scale ruled on its face, and a tube hinged to the face of the disk at the foot of the scale.

5. In a device of the kind described, in combination, a rotatable disk having a scale ruled on its face, an arch-form frame rising from the disk at one end of the scale, and a tube facing the frame and hinged to the face of the disk at the farther end of the scale.

6. In a device of the kind described, in combination, a base having a protractor-scale ruled on its face, means for leveling the base, a disk rotatably mounted on the base and having a line ruled across its face and a linear scale dividing the line, the edge of the disk registering with the protractor-scale on the base, an apertured frame rising from the disk at the foot of the scale, and a plummet-cord crossing the aperture of the frame and registering with the line ruled on the disk.

JOHN PAUL GOODE.

Witnesses:
KATHERINE H. GOODE,
HARLAN HARLAND BARROWS.